United States Patent [19]

Lin et al.

[11] Patent Number: 4,659,383

[45] Date of Patent: Apr. 21, 1987

[54] HIGH MOLECULAR WEIGHT, HOT MELT IMPULSE INK JET INK

[75] Inventors: An-Chung R. Lin, New Town; Theodore M. Cooke, Danbury, both of Conn.

[73] Assignee: Exxon Printing Systems, Inc., Brookfield, Conn.

[21] Appl. No.: 644,542

[22] Filed: Aug. 27, 1984

Related U.S. Application Data

[63] Continuation-in-part of Ser. No. 610,627, May 16, 1984, Ser. No. 565,124, Dec. 23, 1983, abandoned, and Ser. No. 394,153, Jul. 1, 1982, abandoned, said Ser. No. 610,627, is a continuation-in-part of Ser. No. 507,918, Jun. 27, 1983, Pat. No. 4,484,948, which is a continuation of Ser. No. 331,604, Dec. 17, 1981, Pat. No. 4,390,369, said Ser. No. 565,124, is a continuation of Ser. No. 394,153.

[51] Int. Cl.$^4$ .............................................. C09D 11/06
[52] U.S. Cl. ........................................ 106/27; 523/160
[58] Field of Search ................ 106/27, 20; 523/160, 523/161, 164

[56] References Cited

U.S. PATENT DOCUMENTS

| | | | |
|---|---|---|---|
| 2,426,248 | 8/1947 | Sugarman | 106/23 |
| 3,282,709 | 11/1966 | Ehrhardt et al. | 106/27 |
| 3,282,853 | 11/1966 | Bennett | 252/172 |
| 3,330,673 | 7/1967 | Voet et al. | 106/22 |
| 3,353,974 | 11/1967 | Trimble et al. | 106/22 |
| 3,382,088 | 5/1968 | Noda | 106/27 |
| 3,421,910 | 1/1969 | Gilson et al. | 106/22 |
| 3,653,932 | 4/1972 | Berry et al. | 106/22 |
| 3,715,219 | 2/1973 | Kurz et al. | 106/22 |
| 3,846,141 | 11/1974 | Ostergren et al. | 106/22 |
| 3,994,736 | 11/1976 | Hertz et al. | 106/22 |
| 4,005,237 | 1/1977 | Panken | 428/195 |
| 4,038,297 | 7/1977 | Rodenberg et al. | 106/27 |
| 4,069,179 | 1/1973 | Jones | 106/27 |
| 4,153,467 | 5/1979 | Yano et al. | 106/20 |
| 4,165,399 | 8/1979 | Germonprez | 427/264 |
| 4,176,361 | 12/1979 | Kawada et al. | 346/1.1 |
| 4,238,807 | 12/1980 | Bovio et al. | 346/140 |
| 4,243,994 | 1/1981 | Kobayashi et al. | 346/140 |
| 4,248,746 | 2/1981 | Greiner | 260/23 |
| 4,250,512 | 2/1981 | Kattner et al. | 346/140 |
| 4,273,847 | 6/1981 | Lennon et al. | 430/106 |
| 4,281,329 | 7/1981 | Yano et al. | 346/1.1 |
| 4,312,009 | 1/1982 | Lange | 346/140 |
| 4,337,183 | 6/1982 | Santiago | 524/446 |
| 4,361,843 | 11/1982 | Cooke et al. | 346/1.1 |
| 4,386,961 | 6/1983 | Lin | 106/22 |
| 4,390,369 | 6/1983 | Merritt et al. | 106/31 |
| 4,395,287 | 7/1983 | Kobayashi et al. | 106/20 |
| 4,396,429 | 8/1983 | Matsumoto et al. | 106/20 |
| 4,400,215 | 8/1983 | Cooke | 106/22 |
| 4,409,040 | 10/1983 | Tabayashi et al. | 106/20 |
| 4,421,559 | 12/1983 | Owatari | 106/20 |
| 4,426,227 | 1/1984 | Keeling et al. | 106/27 |
| 4,443,820 | 4/1984 | Mutoh et al. | 358/296 |
| 4,475,113 | 10/1984 | Lee et al. | 346/1.1 |

FOREIGN PATENT DOCUMENTS

| | | |
|---|---|---|
| 147257A | 7/1985 | European Pat. Off. |
| 2101864 | 7/1972 | Fed. Rep. of Germany |
| 2441478 | 3/1975 | Fed. Rep. of Germany |
| 2753816 | 6/1978 | Fed. Rep. of Germany |
| 49-80708 | 7/1974 | Japan |
| 55-54368 | 4/1980 | Japan |
| 55-468 | 1/1981 | Japan |
| 113462 | 9/1981 | Japan |

OTHER PUBLICATIONS

Abstract No. 86-009196/02, "Application of Thermoplastic Composition of Wax and/or Resin Medium Using Non-Contact Ink Jet Printing Apparatus and Improving Definition, Adhesion and Resistance to Smudging", Willett.

Sweet, Richard G., "High Frequency Oscillography with Electrostatic Deflected Ink Jets", Stanford Electronics, Ltd., Technical Report No. 1722-1, Mar., 1964.

Handbook of Chemistry and Physics, 49th Edition.

The Condensed Chemical Dictionary.

Owens, "New Ink-Writing Methods for Graphic Recording" Instruments & Control Systems, vol. 38, pp. 100-102, Jul., 1965.

Hendricks, "Ink Splitter for Hot Melt Ink", IBM Technical Disclosure Bulletin, vol. 28, No. 3A, pp. 947-948, Aug., 1983.

Japanese Abstract No. 56-113462(A).

Japanese Abstract No. J56166-274.

*Industrial Waxes*, H. Bennett, vols. 1 and 2, Chemical Publishing Co., Inc., New York, N.Y. (1975).

Abstract No. 47097C/27 "Quick Drying Ink for Ink Jet Recording—Comprises Oil-Soluble Dye, Alcohol Amine and Volatile Polar Solvent".

Abstract of Jap. Appln. No. 132,548 "Ink Compositions for Ink Injection Type Recording Apparatus".

Abstract No. 95:229337z "Preparation of Hectographic Plates" 74—*Radiation Chem. Photochem.*, vol. 95, p. 643 (1981).

(List continued on next page.)

*Primary Examiner*—Amelia B. Yarbrough

[57] ABSTRACT

A novel hot melt impulse ink jet ink is disclosed which comprises a $C_{20}$-$C_{24}$ acid or alcohol containing vehicle, preferably behenic acid, and a suitable coloring agent. The preferred ink has a melting point above about 65° C., exhibits very good jettability, good heat stability at a reservoir temperature of 90° C., good material compatability, and an improved print quality. The preferred ink comprises about 80% natural behenic acid, 15% of a ketone (such as stearone), 3% coloring agent, and 2% of a plasticizer intended to improve print quality. The subject inks are jetted at relatively high temperatures (80°-90° C.) using impulse ink jet devices. Upon impact with the target substrate the subject inks freeze to produce a high quality print having a smear resistance approximately equal to IBM copy, and cracking resistance better than such copy.

30 Claims, No Drawings

OTHER PUBLICATIONS

Abstract No. 06955B/04 "Oily Ink Compsn. for Stamping, Recording, Jet Printing, etc.—Can be Used on Plastic, Glass, Metal, Wood, etc. Is not Sticky and has Good Water Resistance".

Abstract No. 43987C/27 "Non-Impact Recording Process—By Forming Images or Recording Substrate Using Water or Oil Based Ink Applying Toner to Images and Fixing Toner".

Abstract No. 45784 C/26 "Quick Drying Ink for Ink Jet Recording—Contains Oil-Soluble Dyes, Alcohol-Amine(s) and Polyvalent Alcohol Derivs".

Abstract No. 89298X/48 "Ink Compsns for Ink Injection Type Recording Appts—Prepared by Dissolving or Dispersing Oil Soluble Dye Dissolved in Liquid Fatty Acid in Aromatic Hydrocarbon Opt. Contg. Nonionic Surfactant".

Abstract of Jap. Serial No. 77/17,758 "Magnetic Ink—Jet Printing Process".

Abstract No. 107587 "Inks for Ink-Jet Recording".

Abstract No. J3503 C/39, "Ink Jet Printer with Uniform Droplets—Uses Resistance Heating Elements to Control Generation of Ink Jet Droplets".

Abstract No. K5010 C/44 "High Speed Recording Equipment Drop Generator—Has Heating Element Producing Bubbles Near End of Fine Tube".

Abstract No. L6528 C/49 "Print Head for Ink Jet Printer—With Discharge Orifice has Inbuilt Electro-Thermal Heating Space".

Abstract No. J55145-774 "Low Softening Point Ink for Ink-Jet Recording Contains Water Soluble Dye, Polyhydric Alcohol & Aliphatic Monohydric Alcohol".

Abstract No. 800333 "Recording Medium for Ink Jet Recording Process Comprises Colourant, Solvent and a Substance that Liberates a Vapour when Heated".

Abstract No. 35067C/20 "Ink Jet Recording Head—With Heating Element at Junction of Liquid Inlet and Inclined Expulsion Zone".

Abstract 702458/39 "Ink for Hot Ink Jet Recording Process—Contains Recording Component Decomposing at Temp. Well Above b.pt. of Solvent or Dispersion Medium".

Abstract No. 169865-EG "Hot Melt Electrostatic Printing Ink".

Abstract No. 117965-EG "Electrostatic Printing Ink Compn".

HIGH MOLECULAR WEIGHT, HOT MELT IMPULSE INK JET INK

CROSS-REFERENCE TO RELATED APPLICATIONS

The present application is a continuation-in-part of application Ser. No. 610,627 filed in the names of Alfred R. Merritt, Theodore M. Cooke, An-Chung R. Lin, and Richard G. Whitfield on May 16, 1984, for "A Demand Ink Jet Utilizing a Phase Change Ink and Method of Operating" which is a continuation-in-part of application Ser. No. 507,918, filed in the names of Alfred R. Merritt, Theodore M. Cooke, An-Chung R. Lin, and Richard G. Whitfield on June 27, 1983 for a "Natural Wax Containing Ink-Jet Ink", now U.S. Pat. No. 4,484,948, which in turn is a continuation of application Ser. No. 331,604 filed in the names of Alfred R. Merritt, Theodore M. Cooke, An-Chung R. Lin, and Richard G. Whitfield on Dec. 17, 1981 for a "Natural Wax Containing Ink-Jet Ink", now U.S. Pat. No. 4,390,369, each of which applications are assigned to the assignee of the present application, and which are hereby incorporated by reference.

The present application is also a continuation-in-part of application Ser. No. 394,153, filed in the names of An-Chung R. Lin, Richard G. Whitfield, and Theodore M. Cooke on July 1, 1982, entitled "Stearic Acid Containing Ink Jet Inks", now abandoned, and its continuation application Ser. No. 565,124, now abandoned, filed in the names of An-Chung R. Lin, Richard G. Whitfield, and Theodore M. Cooke on December 23, 1983 each of which applications is assigned to the assignee of the present application, and each of which is hereby incorporated by reference.

BACKGROUND OF THE INVENTION

The present invention relates to the field of ink jet inks which are used in impulse (drop on demand) types of ink jet printers. More particularly, the present application relates to such ink jet inks which exhibit good crack and smear resistances, are heat stable, and are easily jettable using drop on demand type apparatus.

Originally, printing with hot melt type ink was suggested in connection with electrostatic printing apparatuses. In U.S. Pat. No. 3,653,932 (Berry et al), entitled "Electrostatic Printing Composition Comprising Didodecyl Sebacate", an electrostatic printing process is disclosed using an ink comprised of one or more of specified di-esters. In the Berry process, ink is heated into a fluid phase and is caused to form a convex meniscus at the nozzle tip by hydrostatic pressure. This pressure causes the end of the ink to intrude into an electrostatic field. Ink is then electrostatically drawn into a single file stream of drops which traverses the span between the tip of the nozzle and the carrier. The preferred inks for use in this process are di-esters of sebacic acid which have been esterified with alcohols of paraffins having 12 or less carbon atoms in their chains. Each of the preferred inks is disclosed as having a melting point "which does not exceed about 51° C and a freezing point which is not below 30° C", to ensure that the ink will be in a liquid phase at the operating temperature of the exemplary reservoir, namely, about 56°±3° C., and that it "will be solid at generally encountered room temperatures to minimize its flow from the carrier".

U.S. Pat. No. 3,715,219 (Kurz et al) discloses a similar electrostatic printing process using an ink composition comprising about 3% by weight of a dye, and the remainder a vehicle comprised of at least one alcohol of the paraffin series which has the general formula $CH_3(CH_2)_nCH_2OH$, in which n is integer between 12 and 16. According to Kurz, the preferred hot melt type inks have melting points which do not exceed about 61° C. and freezing points which are not below about 30° C. During the process, ink in a fluid phase is supplied at a constant flow rate from a source represented by supply tube 10 to reservoir 11 which terminates in a nozzle 12 with a capillary bore. The chamber 11 of the exemplary apparatus is maintained at a temperature in the range of about 62° C. and 82° C. during the disclosed process. Viscosity of the disclosed inks are said to be within a range having an upper limit of 50 centipoises at operating temperatures, the exemplary inks in the Kurz et al references having viscosities of between 4.0–5.9 at 80° C.

More recently, impulse ink jet printing processes using hot melt inks have been disclosed. Impulse ink jet printing differs from electrostatic printing in that individual droplets are discharged from a printing head in response to relatively low pressures which are typically achieved using piezoelectric head elements. Unlike electrostatic printing processes, such drop on demand processes produce much larger droplets which decelerate, not accelerate, as they move towards the carrier.

One recent hot impulse ink jet hot melt ink is disclosed in U.S. Pat. No. 4,390,369 (Merritt et al), entitled "Natural Wax-Containing Ink Jet Inks". This patent discloses the use of a number of natural waxes, such as Japan wax, candelilla wax, carnauba wax, etc.. These waxes may be used at percentages of from 0.5 to 97.0% by weight either as the basic fluid vehicle of the ink or as an additive to other fluidic vehicles such as fatty acids, more particularly oleic acid or oleic acid with benzyl ether. Merritt et al disclose a number of such inks having viscosities of 6.7 to 15.7 at 165° F. (about 74° C.).

In related application Ser. No. 394,153, filed July 1, 1982 (Lin et al), a number of hot melt impulse ink jet inks are disclosed which are described as being solid or semi-solid at ambient temperature. The preferred ink is disclosed as comprising stearic acid in an approximate weight range from 50 to 99%. As explained in that application, commercially available stearic acids are produced from saponified and distilled animal fats, usually being composed of 60% liquid and 40% solid acid, the bulk of the liquid acids being separated from the solid acids by hydraulic pressing to produce, for example, single-pressed, double-pressed, triple-pressed stearic acids etc. According to the *Handbook of Chemistry and Physics*(49th edition), chemically pure stearic acid is octadecanoic acid $(CH_3(CH_2)_{16}CO_2H$ (melting point 70.1° C.). In addition to stearic acid, the Lin et al application discloses that additives such as oleic acid, typophor black, nigrosine base, benzyl ether, compounded or chemically modified waxes (including natural or other synthetic substances), a coloring agent or dye, such as oil or solvent soluble dye, etc. may be used in formulating the disclosed hot melt inks.

Applicants have found that stearic acid containing inks exhibit very good jettability, good heat stability (3–5 days at 120° C.; projected to be 20–30 days at 90° C.), good material compatibility, and smearing and cracking behavior which is comparable to or slightly worse than that of an IBM photocopy. Applicants have further noticed that stearic acid inks, due to their vapor pressures at higher temperatures, have a tendency to produce snow-like condensates on the interior parts of the printing mechanisms with which they are used. An ink comprising, for example, 97% stearic acid and 3% Calco nigrosine base was found to have a melting point of about 145° F., a surface tension at 80° C. of 28.9 dynes cm, and viscosities of 11.0 at 75° C. and 9.0 centipoises at 85° C. Notwithstanding the advances which have been in the art of hot melt ink jet ink printing, a need still exists for inks which are impulse jettable, heat stable, material compatible, and which exhibit good print qualities, particularly good resistances to smearing and cracking.

SUMMARY OF THE INVENTION

The present invention provides novel hot melt impulse ink jet inks comprising acid or alcohol vehicles in the $C_{20}C_{24}$ range. These inks further comprise significant proportions of a relatively high melting point ketone, such as stearone, which acts to plasticize the ink upon hardening, does not interfere with (and may enhance) the solubility of the coloring agent, and exhibits good heat stability. These preferred inks further comprise small percentages of a (acrylic resin) plasticizer which further prevents cracking and smearing of the subject ink upon solidification.

More particularly, the preferred vehicle of the hot melt impulse ink jet inks of the present invention comprises 30–100 wt % $C_{20}$–$C_{24}$ acids or alcohols, 0–50 wt % of a ketone, such as stearone, having a melting point between 80°–120° C. (preferably 80°–100° C.); and 0–30 wt % of $C_{14}$–$C_{19}$ acid(s) or alcohol(s). These inks further comprise 0–4% of a solid plasticizer (preferably having a melting point between 80°–120° C.) and 0.1%–10%, preferably 1–5%, more preferably about 2–3% of a dye, such as nigrosine base.

As seen from the above, subject inks also comprise minor proportions of shorter chain fatty acids in the $C_{14}$–$C_{18}$ range. Such shorter chain fatty acids should not exist in percentages as great as those of the $C_{20}$–$C_{24}$ acids or alcohols, and are generally present because commercial grades of acids such as behenic acid comprise such materials. The preferred ink of the present invention accordingly, consists of about 80 wt % of a commercial behenic acid product (Hydrofol 2260); 15 wt % stearone; 3% of a dye, such as nigrosine base; and 2% plasticizer (acrylic resin, Acryloid DM-55).

Alternatively, the vehicle of the present invention may comprise additions of waxes, such as candelilla wax, which melt above 65° C.

Accordingly, a primary object of the present invention is the provision an improved impulse ink jet ink and method for jetting same.

A further object of the present invention is the provision of an improved hot melt impulse ink jet ink exhibiting good jettability, heat stability, and material compatibility.

A further object of the present invention is the provision of an improved ink jet ink exhibiting good smearing resistance and superior cracking resistance.

These, and other objects of the present invention, will be apparent from the following more detailed description.

DESCRIPTION OF THE PREFERRED EMBODIMENTS

The present invention provides novel hot melt impulse ink jet inks which provide substantial advantages over those heretofore known to the art. It has been recognized that in addition to jettability, important characteristics of hot melt impulse inks include their heat stability, material compatibility (particularly the solubility or other compatibility of coloring agents such as nigrosine base in the vehicle), and a clear, well defined print, which is resistant to smearing and cracking.

The formulation of high quality impulse ink jet inks requires the balancing of many important factors. For example, hot melt inks which have relatively low melting points are typically susceptible to smearing. As the melting points of those inks are increased, smearing resistance is improved, but the viscosity increases. While the viscosity of many inks can be reduced to a jettable range by increasing the temperatures at which they are jetted, higher jetting temperatures bring with them heat stability problems which can lead to the decomposition of the subject inks when heated over long periods of time in typical drop on demand type printers.

As mentioned above, a very good prior hot melt ink jet ink comprises 97% stearic acid and 3% nigrosine base. This ink exhibits viscosities of 11.0 centipoises at 75° C., and 9.0 centipoises at 85° C. Its surface tension is 28.9 dynes cm at 80° C., and its melting point is approximately 145° F. (62.7° C.). While this ink shows very good jettability, very good material compatibility, and smearing and cracking resistances comparable to or slightly worse than an IBM photocopy, the heat stability of this stearic acid ink is only 3–5 days when tested at the 120° C. This is projected to translate into only 20–30 days of stability at 90° C. before perceptible deterioration (based on jet performance) occurs.

It is theorized that acids in the $C_{20}$–$C_{24}$ range exhibit a greater thermal stability due to the fact that there are fewer carboxy groups by weight in these longer chain acids. Commercial grade behenic acid, which comprises approximately 70% $C_{20}$–$C_{24}$ acids (most of the remainder being stearic acid) has thus been found to be a suitable primary component for an impulse ink jet vehicle due to its heat stability and compatibility with colorants, such as nigrosine base. As a relatively higher molecular weight material, however, $C_{20}$–$C_{24}$ acids are somewhat more prone to cracking than their lower molecular weight counterparts. Moreover, in order to achieve good jettability with state of the art printers, inks of the present invention should exhibit viscosities of no more than about 14 centipoises at 80° C., such that they may be jetted at operating temperatures of between 80° and 90° C.

Accordingly, the present invention provides a hot melt impulse ink jet ink which is solid at room temperature and has a viscosity of no more than about 14 centipoises at 80° C., which ink comprises 0.1–10 wt % of a coloring agent, preferably a dye such as nigrosine base. This ink further comprises a vehicle for carrying that coloring agent consisting essentially of 30–100 wt % of $C_{20}$–$C_{24}$ acid(s) or alcohol(s), 0–50 wt % of ketone(s) having a melting point of 60°–120° C.; and 0–30 wt % of $C_{14}$–$C_{19}$ acid(s) or alcohol(s); and 0–4% of a plasticizer, such as an acrylic resin plasticizer, for improving the cracking resistance of said ink.

The preferred inks of the present invention comprise 1–5, preferably 2–3 wt % of coloring agent; and about 2% of said plasticizer. The preferred vehicle should comprise at least 86 wt % of the ink. This vehicle preferably comprises 40-90, more preferably 50-70 wt % of said $C_{20}$-$C_{24}$ acid(s) or alcohol(s), acids being preferred over alcohols. Since commercial grades of behenic acids are preferred, the preferred vehicle may also comprise lesser amounts of $C_{20}$-$C_{24}$ acid(s) or alcohol(s), once again with acids being preferred over alcohols. In any event, it is preferred that the weight of the $C_{20}$-$C_{24}$ component of the vehicle be at least 150%, and preferably twice, the weight of the $C_{14}$-$C_{19}$ component of the vehicle.

It is desired for the preferred ink of the present invention to have a melting point of at least 65° C., yet satisfy the aforementioned viscosity requirements within the 80°-90° C. intended operating temperatures.

In order to assist in solublizing the coloring agent, to aid the crack resistance of the resulting ink, and to satisfy to the aforementioned viscosity requirements of the ink, it is preferred to include in the vehicle 0-50, preferably 5-25, more preferably 10-20 wt % of a ketone or ketone(s) having a melting point of 65°-120° C. The preferred ketone for this purpose is stearone (18-pentatriacontanone), which has a melting point of 87.8° C. Another suitable ketone is laurone.

The invention may further be understood by reviewing the following examples:

EXAMPLE 1

An experimental impulse ink jet ink was prepared consisting of 97 wt % Hydrofol 2260 and 3% Calco nigrosine base. Hydrofol is a commercially available grade of behenic acid having the following molecular weight distribution:

| Carbon Number | Percent |
| --- | --- |
| $C_{14}$ | 0.12 |
| $C_{16}$ | 1.30 |
| $C_{18}$ | 28.47 |
| $C_{20}$ | 8.50 |
| $C_{22}$ | 59.77 |
| $C_{24}$ | 1.34 |

The resulting ink was found to have a viscosity of 11.4 centipoises at 85° C., and 8.7 centipoises at 95° C. In this and the following examples, the ink was tested for jettability using the apparatus disclosed in the aforementioned related application Ser. No. 610,627, filed May 16, 1984. The ink of this example could be jetted acceptably, but was unacceptable due to its cracking characteristics.

EXAMPLE 2

An impulse ink jet ink was prepared using 95% Hydrofol, 3% Calco nigrosine base, and 2% of an acrylic resin plasticizer sold under the trade name Acryloid DM-55, which is available for purchase from the Rohm & Haas Company, Philadelphia, PA. The resulting ink was jettable, but also exhibited unacceptable cracking.

EXAMPLE 3

An impulse ink jet ink was prepared from 93% Hydrofol, 4% Acryloid DM-55 and 3% Calco nigrosine base. The resulting ink, which had a viscosity of 14.5-15 centipoises at 80° C. was considered to have too high a viscosity for jetting using the above mentioned device.

EXAMPLE 4

An impulse ink jet ink comprising 78% Hydrofol, 15% stearone, 4% Acryloid DM-55 and 3% Calco nigrosine base was formulated, and found to have a viscosity of 15.2 centipoises at 80° C.

EXAMPLE 5

An impulse ink jet ink (sample 4I) was formulated having 80% Hydrofol, 15% stearone, 2% acryloid resin, and 3% Calco nigrosine base. This ink was found to have a suitable viscosity (13.8 to 14.0 centipoises at 80° C.), smearing resistance comparable to the aforementioned stearic acid ink, and cracking resistance which was both better than that ink, and better than IBM photocopy (IBM Series III copier). The material compatibility of this ink was found to be very good (about the same as the aforementioned stearic acid ink) and to exhibit very good jettability. Perhaps more importantly, in an accelerated heat stability test at 120° C., the subject ink was found to last 7-14 days (based on jet performance), which is projected to provide 50-100 days of stability at 90° C., or up to 70 days in a stainless steel device. This ink was found to have a viscosity of 9.0 centipoises at 100° C., to have a surface tension of 27.5 dynes cm at 80° C., and to have a melting point of about 155° F. (about 68° C.).

EXAMPLE 6

An impulse ink jet ink was formulated using 50 parts Hydrofol 2260, 50 parts stearone, and 3 parts Calco nigrosine base. The resulting ink had a viscosity of 9.2 at 85° C. and 7.5 at 95° C. The resulting ink was jettable, but was judged as exhibiting marginal solubility of the colorant in the vehicle.

EXAMPLE 7

An impulse ink jet ink (sample 10C) was formulated comprising 30% Hydrofol, 1.5% Calco nigrosine base and 68.5% candelilla wax. The resulting ink was found to be jettable, and to exhibit a heat stability of greater than or equal to 23 days at 120° C., again based on jet performance. Accordingly, the vehicle of the present invention may further comprise additions of 0 to 70 wt % of a wax, such as refined candelilla wax, which melts at temperatures above 65° C. Such waxes include bamboo leaf, certain beeswaxes, caranda, carnauba, hydrogenated castor oil, Chinese insect, cotton, cranberry certain Douglas-fir bark, esparto, certain flax, Indian corn, Madagascar, most microcrystalline waxes, montan, ouricury, ozocerite, palm, peat wax, rice bran, shellac wax, sisal hemp, sorghum grain, Spanish moss, and refined sugar cane waxes.

Accordingly, it will be seen that novel hot melt impulse ink jet inks are provided which represent a substantial advance in the art.

We claim:
1. A hot melt impulse ink jet ink, comprising:
 (a) 0.1 to 10 wt. % coloring agent; and
 (b) a vehicle for carrying said coloring agent in said ink, comprising:
  (i) 30-100 wt % of $C_{20}$-$C_{24}$ acid(s);
  (ii) 0-50 wt % of ketone(s) having a melting points of 65°-120° C; and
  (iii) 0-30 wt % of $C_{14}$-$C_{19}$ acid(s) or alcohol(s) said ink being solid at room temperature.
2. The hot melt ink of claim 1 wherein said coloring agent comprises 1 to 5 wt % of said ink.

3. The hot melt ink of claim 2 wherein said coloring agent comprises 2 to 3 wt % of said ink.

4. The hot melt ink of claim 3 wherein said coloring agent is nigrosine base.

5. The hot melt ink of claim 1 wherein said $C_{20}$-$C_{24}$ acid(s) comprise 40-90 wt % of said vehicle.

6. The hot melt ink of claim 1 wherein said $C_{20}$-$C_{24}$ acid(s) comprise 50-70 wt % of said vehicle.

7. The hot melt ink of claim 1 wherein said $C_{20}$-$C_{24}$ acid is behenic acid.

8. The hot melt ink of claim 1 wherein said ink contains at least 86% of said vehicle.

9. The hot melt ink of claim 1 wherein the weight of $C_{20}$-$C_{24}$ acid(s) is at least 150% of the weight of said $C_{14}$-$C_{19}$ acid(s) or alcohol(s).

10. The hot melt ink of claim 9 wherein the weight of said $C_{20}$-$C_{24}$ acid(s) is at least twice the weight of said $C_{14}$-$C_{19}$ acid(s) or alcohol(s).

11. The hot melt ink of claim 1 wherein said ink has a viscosity at 80° C. of no more than about 14 centipoises.

12. The hot melt ink of claim 11 wherein said ink has a viscosity of 80° C. of 12-14 centipoises.

13. The hot melt ink of claim 1 having a melting point of at least 65° C.

14. The hot melt ink of claim 1 wherein said coloring agent is a dye.

15. The hot melt ink of claim 1 wherein said ketone(s) comprises 5-25 wt % of said vehicle.

16. The hot melt ink of claim 15 wherein said ketone(s) comprise 10-20 wt % of said vehicle.

17. The hot melt ink of claim 1 wherein said ketone is stearone.

18. The hot melt ink of claim 1 wherein said ketone is laurone.

19. The hot melt ink of claim 1 further comprising 0-4 wt % of plasticizer.

20. The hot melt ink of claim 19 wherein said plasticizer is an acrylic resin.

21. The hot melt ink of claim 20 wherein said plasticizer comprises about 2 wt % of said ink.

22. A hot melt impulse ink jet ink, consisting essentially of:
(a) 0.1 to 10 wt % coloring agent;
(b) 86-99.9 wt % of a vehicle for carrying said coloring agent in said ink, said vehicle consisting essentially of:
 (i) 30-100 wt % of $C_{20}$-$C_{24}$ acids;
 (ii) 0-50 wt % of ketone(s) having a melting point of 65°-120° C.;
 (iii) 0-30 wt % of $C_{14}$-$C_{19}$ acid(s) or alcohol(s); and
(c) 0-4 wt % plasticizer;
said ink being solid at room temperature and having a viscosity of no more than about 14 centipoises at 80° C.

23. The hot melt ink of claim 22 wherein said ketone is stearone.

24. The invention of claim 22 wherein said $C_{20}$-$C_{24}$ acid(s) are saturated acid(s).

25. The hot melt ink of claim 22 wherein the weight of $C_{20}$-$C_{24}$ acid(s) is at least twice the weight of said $C_{14}$-$C_{19}$ acid(s) or alcohol(s).

26. A method of ink jet printing comprising:
(a) providing a hot melt impulse ink jet ink which is solid at room temperature and which has a viscosity of no more than about 14 centipoises at 80° C., said ink comprising 0.1 to 10 wt % of a coloring agent and a vehicle for carrying said color agent in said ink comprising 30-100 wt % of $C_{20}$-$C_{24}$ acid(s); 0-50 wt % of ketone(s) having a melting point of 65°-120° C.; and 0-30 wt % of $C_{14}$-$C_{19}$ acid(s) or alcohol(s);
(b) heating said ink to at least 80° C; and
(c) discharging droplets of said ink at said temperature from an impulse ink jet towards a print substrate; and
(d) allowing said ink to freeze upon impact with said substrate to form print thereon.

27. A hot melt impulse ink jet ink, comprising:
(a) 0.1 to 10 wt % coloring agent; and
(b) a vehicle for carrying said coloring agent in said ink, comprising:
 (i) 30-100 wt % of $C_{20}$-$C_{24}$ acid(s);
 (ii) 0-30 wt % of $C_{14}$-$C_{19}$ acid(s) or alcohol(s); and
 (iii) 0-70 wt % of a wax having a melting point of no less than 65° C.;
said ink being solid at room temperature.

28. The hot melt ink jet ink of claim 27 wherein said Wax is candelilla.

29. The hot melt ink of claim 27 having a viscosity of no more than about 14 centipoises at 80° C.

30. The hot melt ink of claim 29 having a viscosity of about 12-14 centipoises at 80° C.

* * * * *